United States Patent
Spott et al.

(10) Patent No.: US 8,213,319 B2
(45) Date of Patent: Jul. 3, 2012

(54) FAULT LOCATION

(75) Inventors: Martin W Spott, Ipswich (GB);
Richard E Tateson, Brundish (GB);
Simon G Thompson, Woodbridge (GB)

(73) Assignee: British Telecommunications plc, London (GB)

( * ) Notice: Subject to any disclaimer, the term of this patent is extended or adjusted under 35 U.S.C. 154(b) by 197 days.

(21) Appl. No.: 12/532,478

(22) PCT Filed: Jan. 11, 2008

(86) PCT No.: PCT/GB2008/000104
§ 371 (c)(1),
(2), (4) Date: Sep. 22, 2009

(87) PCT Pub. No.: WO2008/117004
PCT Pub. Date: Oct. 2, 2008

(65) Prior Publication Data
US 2010/0110903 A1    May 6, 2010

(30) Foreign Application Priority Data

Mar. 23, 2007  (EP) .................................. 07251256
Oct. 12, 2007  (GB) .................................. 0720033.0

(51) Int. Cl.
*H04L 12/26* (2006.01)
(52) U.S. Cl. ......................................................... 370/242
(58) Field of Classification Search .................. 370/242, 370/254, 351
See application file for complete search history.

(56) References Cited

U.S. PATENT DOCUMENTS

| | | | |
|---|---|---|---|
| 5,606,669 A * | 2/1997 | Bertin et al. | 709/223 |
| 5,910,179 A * | 6/1999 | Mohseni | 709/252 |
| 6,314,434 B1 * | 11/2001 | Shigemi et al. | 707/695 |
| 7,324,824 B2 * | 1/2008 | Smith et al. | 455/456.1 |
| 7,382,765 B2 * | 6/2008 | Kennedy et al. | 370/351 |
| 7,453,864 B2 * | 11/2008 | Kennedy et al. | 370/351 |
| 2003/0126299 A1 * | 7/2003 | Shah-Heydari | 709/252 |
| 2005/0232179 A1 | 10/2005 | Dacosta et al. | |

(Continued)

FOREIGN PATENT DOCUMENTS

EP    0 859 491    8/1998

(Continued)

OTHER PUBLICATIONS

International Search Report for PCT/GB2008/000104, mailed Feb. 25, 2008.

(Continued)

*Primary Examiner* — Andrew Lai
*Assistant Examiner* — Juvena Loo
(74) *Attorney, Agent, or Firm* — Nixon & Vanderhye PC

(57) ABSTRACT

Each node in a hierarchical network regularly checks to determine whether its network connection is intact. If not, it autonomously communicates with other nodes in the physical neighborhood, using wireless capability also included at each node. It first searches for a wireless path to its immediate neighbors in the hierarchy attempting to reach a working node connected to the same distribution point. The nodes collect, store and exchange connectivity data on neighboring nodes. One member of a group of nodes that have exchanged connectivity information is selected to transmit a connectivity report to network control center. If not itself connected to the hierarchical network, the selected node can use the connection to the closest working node and its broadband connection to the network control center to inform the network operator of the fault and its likely location.

20 Claims, 4 Drawing Sheets

U.S. PATENT DOCUMENTS

2006/0215588 A1* 9/2006 Yoon .............................. 370/310
2006/0268749 A1* 11/2006 Rahman et al. ............... 370/256

FOREIGN PATENT DOCUMENTS

| JP | 2001/136172 | 5/2001 |
|---|---|---|
| WO | 2005/029278 | 3/2005 |
| WO | 2006/071289 | 7/2006 |
| WO | 2006/113876 | 10/2006 |

OTHER PUBLICATIONS

European Search Report dated Aug. 28, 2007 in EP 07 25 1256.

* cited by examiner

FAULT LOCATION

This application is the U.S. national phase of International Application No. PCT/GB2008/000104 filed 11 Jan. 2008, which designated the U.S. and claims priority to European Application No. 07251256.9, filed 23 Mar. 2007 and Great Britain Application No. 0720033.0, filed 12 Oct. 2007, the entire contents of each of which are hereby incorporated by reference.

BACKGROUND

1. Technical Field

This invention relates to the identification of the locations of faults in a telecommunications network. In particular it concerns networks connecting computing devices to the internet.

2. Related Art

A computing device can be connected to the Internet using a broadband router which links into a telephone line connected to a network exchange. Faults can occur anywhere in this sequence, either between the computing device and router, on the line between the router and the network exchange (including any intermediate connections), or in the computing device, or in the router, or in the exchange itself.

In a network with redundant duplicate connections, failure of an individual link may result in an impairment of service, rather than total loss of service, as the customer terminals may be able to connect by some other route. One example of such redundancy by duplication is the use of a terminal with a wireless connection capability. In the event that a connection by way of the closest or preferred wireless access point fails, such a terminal may have the capability to connect to a different wireless access point, or it may be able to form ad-hoc connections with other similar terminals which can, in turn access the network. It is also known to create an ad-hoc system between two different access points and to re-direct communication between a first access point and the infrastructure via the second access point.

Telecommunications network operators can check for faults using monitoring systems operating from a central location in the network, looking outwards towards the end users. However, it is not feasible to routinely check all network connections very frequently. Moreover, the absence of a response from an end-user may be from a cause other than a fault—the user may simply have switched his terminal off—so such checks cannot be reliable indicators of faults. Consequently, when a customer's connection to the Internet fails, the network operator is usually not immediately aware of this failure. In general, the network operator is only alerted to a fault when the end-user reports it.

Reliance on alerts being raised by the customers causes a delay in detection: in particular, a fault will not be identified until it has already caused inconvenience to the customer. In a network with good duplicate connections, the failure of a link may merely result in an impairment of that service as a result of the reduced capacity available on the remaining connections, rather than the complete loss of the service to some users. Consequently, the failure of an individual link may actually go un-noticed, or at least unreported, until a period of high demand—or the occurrence of a second failure—overloads the system. A failure in such a situation would result in greater inconvenience than would be the case had the initial problem received more prompt attention.

A problem with a centralized approach to fault management is that it is often difficult to identify the location of a fault. This is a particular problem in situations where customer use is infrequent: inability of the network management system to detect activity on a particular connection does not necessarily imply that the connection has failed. The response a line gives to a test signal will depend on what equipment, if any, is connected to the far end at the time the test signal is sent.

BRIEF SUMMARY

The present exemplary embodiment provides a method of operating a telecommunications network wherein a plurality of nodes are connected to a network control center through a branched hierarchical structure having a plurality of levels, and also have the capability to form a second, ad hoc, network by making direct connections with other nodes, wherein on receipt of an attempt to establish communication over the ad hoc network, each node responds by identifying its position in the branched hierarchy, and wherein if a first node detects a failure of its network connection through the branched structure, it attempts communication over the ad hoc network to reach a second node whose connection to the network control center through the branched network has not failed, wherein the first node initially attempts to establish communication over the ad hoc network with a node connected to the same point in the next level of the branched hierarchy, and then at progressively more remote levels, until a second node is identified which has not experienced a network failure, and wherein the first node generates a report for transmission to the network control center indicative of the level in the branched network at which the first and second nodes have a common point of connection, and the report is transmitted from the first node to the network control center by way of the ad hoc network.

The nodes may be embodied as communications devices having the capability to operate in both the ad-hoc and the branched structure. These functions may be independent, using for example a wireless standard such as IEEE 802.11 (Wi-Fi), and a fixed line connection respectively, but they may instead have some common features, for instance at the wireless access level.

Another aspect provides a communications device having first connection means for connection to a network control center system through a first communications network, and second connection means for forming connections with similar communications devices over a second, ad hoc, communications network, characterized in that the device has reception means to receive a request from a similar device to establish communication with the network control center, and transmission means for responding with data relating to its own position in the first communications network, failure detection means for detecting a failure of the network connections through the first communications network, paging means for attempting to establish communication with other communications devices over the second communications network, wherein the paging means is arranged to initially attempt connection with a second node connected to the same point at the next level of the branched hierarchy, and then at progressively more remote levels, until a node is identified which has not experienced a network failure, and reporting means for generating a report for transmission to the network control center indicative of the level in the branched network at which the first and second nodes have a common point of connection.

A plurality of such communications devices, in co-operation with a network control center, co-operate to provide, in another aspect of the invention, a telecommunications network comprising a plurality of nodes connected to a network control center through a branched structure having a plurality of layers, wherein the nodes also have the capability to form ad hoc connections between each other, characterized in that each node has connectivity identification means for responding to an attempt to establish communication over the ad hoc network by identifying its position in the branched hierarchy, failure detection means for detecting a failure of its network connection through the branched structure, and paging means for attempting to establish communication with the network control center by forming an ad hoc connection through other nodes to a second node whose connection to the network control center through the branched network has not failed, wherein the paging means is arranged to initially attempt connection with a second node connected to the same point at the next level of the branched hierarchy, and then at progressively more remote levels, until a node is identified which has not experienced a network failure, and reporting means for generating a report for transmission to the network control center indicative of the level in the branched network at which the first and second nodes have a common point of connection.

The report to the network control center may be sent over any suitable network. In a preferred embodiment, the report is sent by way of the ad hoc network to the selected second node for onwards transmission to the network control center. Preferably, if there is a plurality of available nodes at the same level in the branched hierarchy, the node with the shortest hop distance in the ad hoc network is selected.

The exemplary embodiment therefore allows the use of an ad-hoc network set up between neighboring nodes, both to allow faults within the network to be circumvented by selecting a working channel, and also to allow readier identification by the network operator of the existence of such faults, and of their location.

This decentralized approach to fault detection, initiated at the customer end, automatically provides the network provider with a fault report, without the need for any customer action. It may, therefore, be possible to rectify the fault before the user is even aware of the problem. The number of staff needed in customer contact centers to handle fault reports may also be reduced.

The location of the fault can be determined in a pro-active way, and the network provider can therefore resolve the problem potentially much more quickly, reducing the service down-time. These benefits are particularly apparent in modern networks, which do not have a separate network for carrying diagnostic and other control information.

In a preferred embodiment to be described, at least the nodes not currently connected to the branched network discover and share information about the connectivity of nearby nodes, with the aim of producing a single fault report describing the fault situation, rather than a plethora of individual reports which need to be processed by the network control center. In a preferred arrangement, all nodes, including those currently with working connections to the primary branched network, participate in this process.

Preferably, within the or each ad hoc network formed by a group of nodes which have exchanged connectivity information, one member of the group is selected to transmit a report on connectivity to the network control center, the remaining members of the group being suppressed from transmitting such reports.

If the ad hoc network is disjointed into two or more independent networks, such that not all members of the branched hierarchical network can communicate with each other using a chain of ad hoc connections, the network control centre may have means for co-ordinating the data received from individual devices to confirm or define the location of a reported fault.

BRIEF DESCRIPTION OF THE DRAWINGS

By way of example, there follows a detailed description of one embodiment of the invention, with reference to the drawings, in which.

DETAILED DESCRIPTION OF EXEMPLARY EMBODIMENTS

Figure 1:
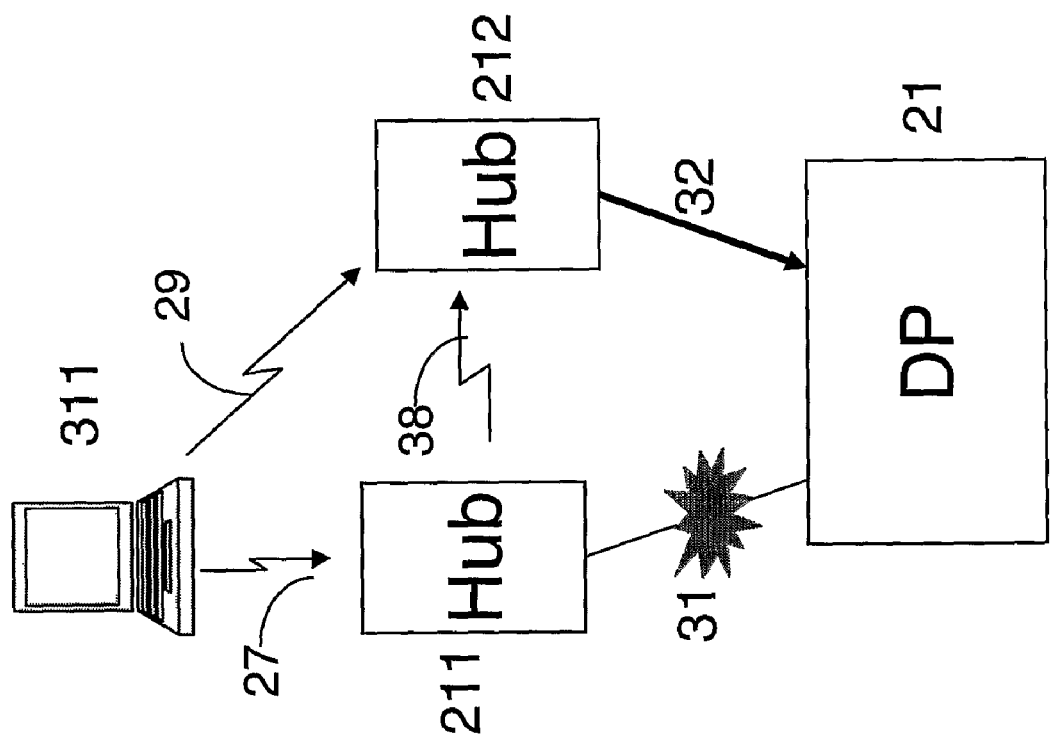
FIG. 1 illustrates alternative connection modes between a wireless-enabled computer terminal and a network connection.

FIG. 1 illustrates a computer 311 which can be connected to the network through a WI-FI connection 27 to a wireless hub. However, if the intended hub 211 has lost its connection 31 to the network, the computer 311 may connect to another nearby hub 212 instead. If the first hub 211 is still operational, such a connection might be realized by a wireless connection 38 between the two hubs 211, 212. Alternatively, a direct wireless connection 29 may be established between the terminal 311 and the neighboring hub 212.

Figure 2:
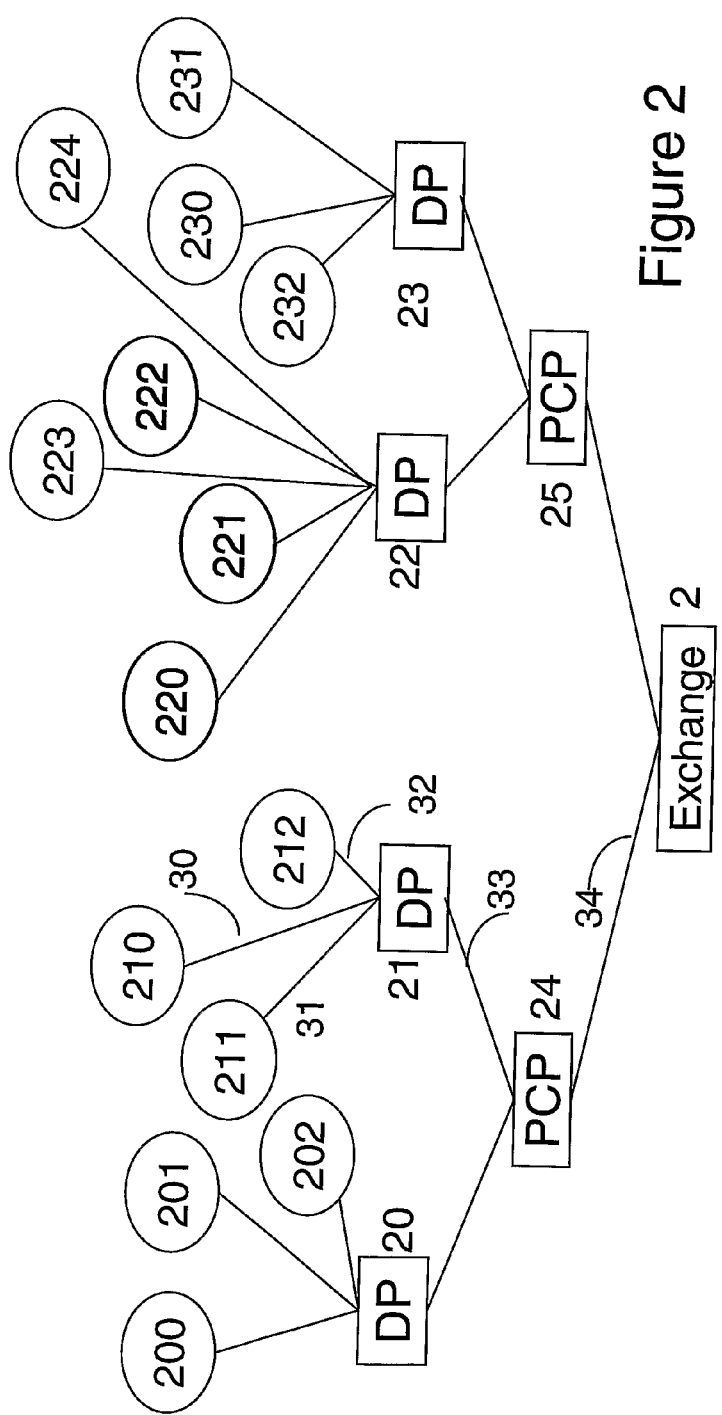
FIG. 2 is a schematic diagram of a hierarchical network structure.

FIG. 2 illustrates a plurality of computing devices 200-202, 210-212, 220-224, 230-232, of which the hub 211 depicted in FIG. 1 is a member, each operating as a communication node (typically a WI-FI access point) connected to the Internet, e.g. via a broadband connection to an exchange 2. The connections follow a branched structure. For example, as already described with reference to FIG. 1, nodes 211, 212 are each connected by respective cables 31, 32 to a distribution point (DP) 20. Similarly, a third node 210 is connected by a cable 30 to the same distribution point 20. The distribution point 20 is in turn connected by way of a cable 33 to a primary cross-connection point 24 (PCP, typically a street-side cabinet) which is, in turn, connected by another cable 34 to an exchange 2. Similar connectivity applies to the other nodes 200-202, 220-224, 230-232, each being connected to one of a number of distribution points 20, 21, 22, 23, which are each in turn connected to one of a (smaller) number of primary cross connection points 24, 25, which are all connected to an exchange 2.

Figure 3:
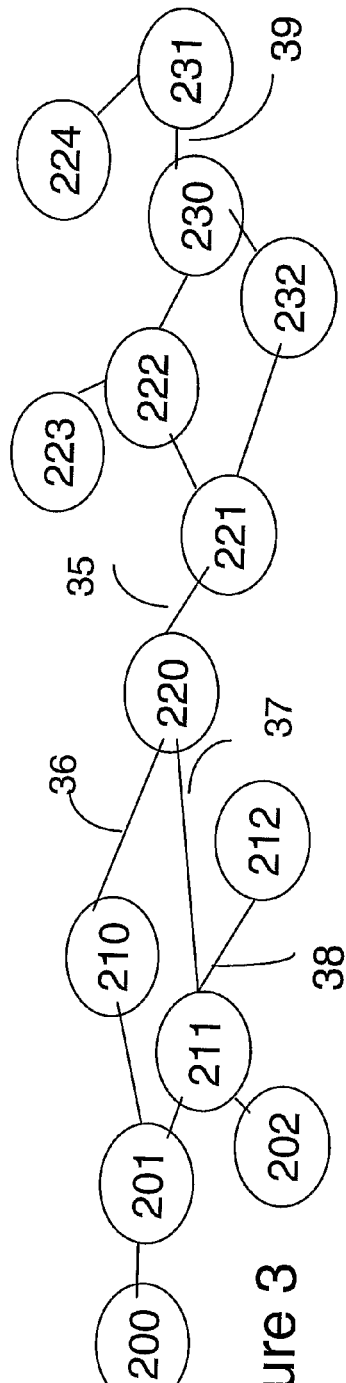
FIG. 3 is a schematic diagram of a fully connected mesh of nodes intercommunicating using a WI-FI protocol.

As also described with reference to FIG. 1, the nodes 200, 201, etc, are all capable of forming nodes of an ad-hoc wireless network as shown in FIG. 3, distributed at such density that the set of nodes are fully wirelessly connected—that is to say that each node is connected to each other node, either directly or through one or more intermediate nodes. Note that more than one independent route may exist between the same two nodes, for example nodes 210, 211 are interconnected both by way of node 201 and by way of node 220. The number of hops on the shortest path between two nodes is referred to as the "distance" between them: for example the node labelled 211 is connected directly (one hop distance) to nodes 201, 202, 212, 220; it is two hops from nodes 200, 210, 221; and so on, being six hops from the furthest node 224.

Figure 4:
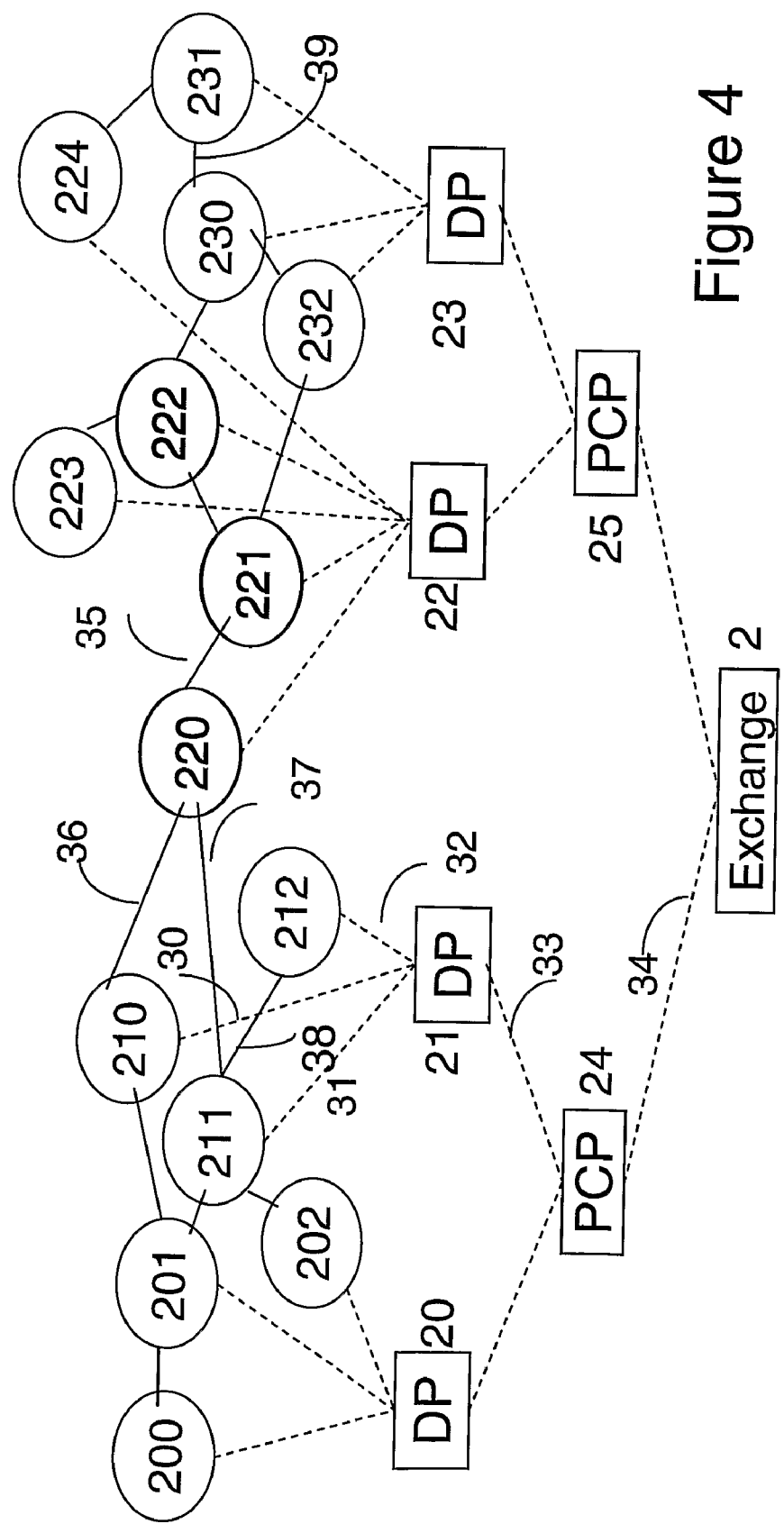
FIG. 4 is a schematic diagram illustrating how the hierarchical network structure of FIG. 2 and the "mesh" or ad hoc network of FIG. 3 overlie each other.

Each node carries a unique identification code (ID) and can identify the DP, PCP and exchange to which it is connected. It will be seen from FIG. 4 that the ad hoc network of FIG. 3 (full lines in FIG. 4) overlies the branched network of FIG. 2 (dotted lines in FIG. 4).

Figure 5:
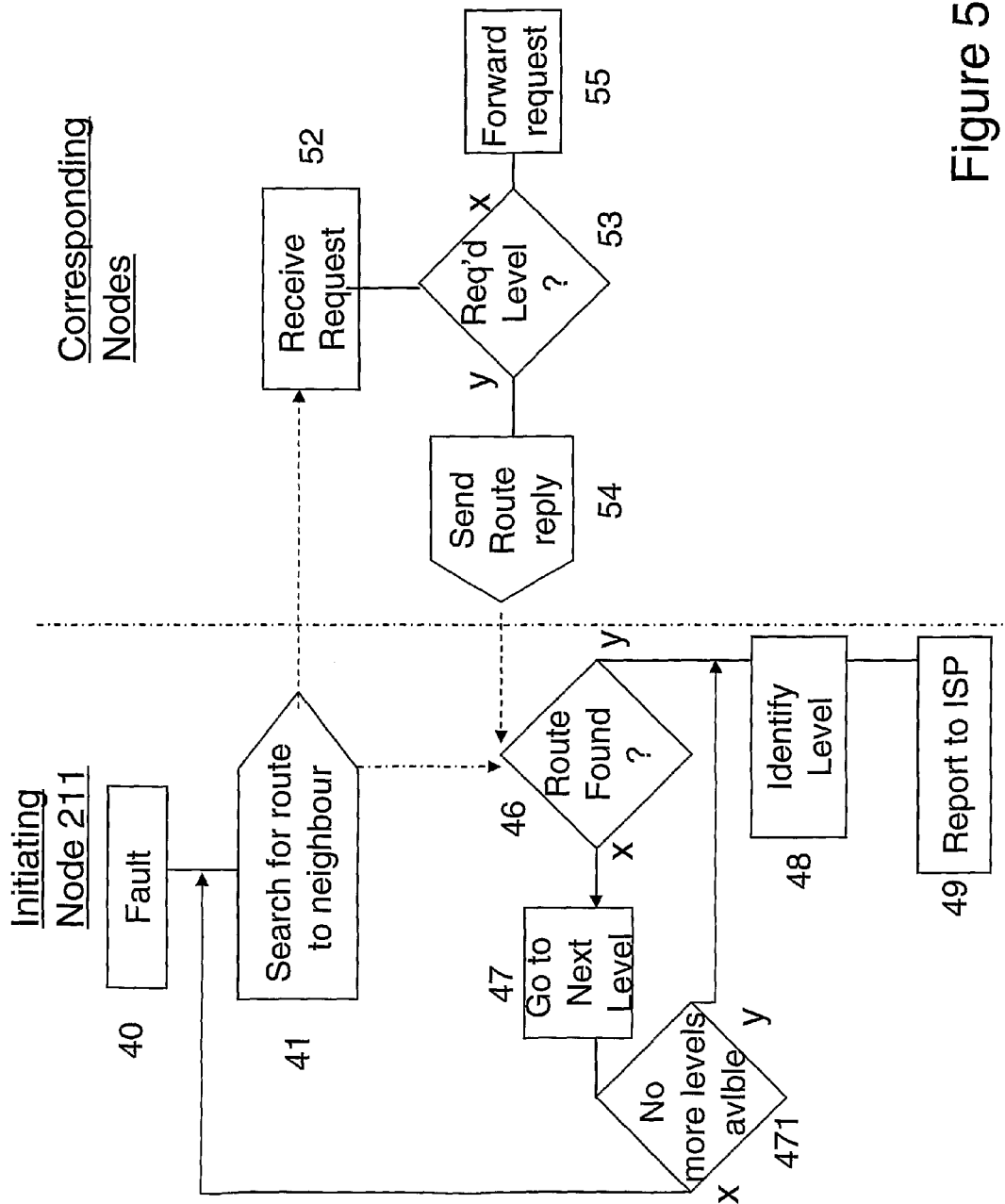
FIG. 5 is a schematic diagram illustrating the information flows that take place in the generation of a fault report according to the exemplary embodiment.

The operation of the embodiment of the invention will now be described with reference to FIG. 5. The steps 40, 41, 46, 47, 471, 48, 49 on the left of FIG. 5 indicate the process performed by the node 211 initiating the process, whilst the steps 52-55 indicate the processes performed by each node 201, 202, 212, 220 that co-operates with the initiating node 211.

Each node checks on a regular basis to determine whether its network connection is intact (step 40). If a node 211 discovers that its direct broadband connection 31, 21, 33, 24, 34 to the exchange 2 has failed, it autonomously communicates with other nodes 201, 202, 212, 220 in the physical neighborhood (see FIG. 3), using its wireless capability (Step 41). It first searches for a path through a WI-FI connection to its immediate neighbors in the hierarchy (FIG. 2) to attempt to reach a working node 210, 212 at the same level (i.e. using the same DP 21).

It should be noted that the nearest neighbours 201, 202, 212, 220 in the wifi network shown in FIG. 3 (i.e. those within wireless range) are not necessarily the nearest neighbours 210, 212 in the hierarchy shown in FIG. 2.

The identification of a path to reach a working node can use known techniques for finding a route between two nodes in a wireless ad hoc network, such as Dynamic Source Routing (DSR) and Ad hoc On-demand Distance Vector routing (AODV). Both these methods dynamically find and maintain routes between nodes via a chain of other network nodes. However, DSR and AODV are designed for a slightly different situation to the present case, insofar as the originating node of a message identifies the ID (IP address) of a specified destination node, i.e. a node A is to send a message to node 220. In the present case, the node 211 is attempting to contact any member of a specified group of nodes defined by the node characteristics DP, PCP, exchange and status (working or non-working Internet connection). For example, if the node 211 requires a working node working to the same DP 21, any node 210, 212 meeting this criterion would qualify as a destination.

DSR and AODV can be changed to accommodate this situation by slightly adapting their protocols. Instead of carrying the ID of the destination node, route requests (RREQs) carry a desired characteristic of the destination node, indicative of its connectivity on the branched network. When attempting connection to a new node (step 52) over the WI-FI network, these desired characteristics are checked against corresponding characteristics of the node to determine if the connectivity of the node qualifies as a suitable destination (step 53). If the node (e.g. node 212) is connected at the appropriate level (step 53y), a route reply (RREP) 54 is generated which carries these additional characteristics, as well as the identity code of the node 212. If the node (e.g. node 220) is not connected at the appropriate level (step 53x), no reply is sent. Instead, the node forwards the request on to its own neighbors (210, 221) in the WI-FI network (step 55). These then in turn perform the same steps 52-55, and if any of them is connected at the appropriate level, it will send a reply 54.

Some variations of the algorithms can improve routes by comparing a found route carried by a RREP with cached routes in other nodes through which the RREP is passing. Again this mechanism can be extended for the present purpose. If a cached route from the node 211 to a destination node 212 is shorter than the route to another node 210 with the same characteristics, then the cached route can replace the route in the RREP, even though the IDs of the destination nodes 210, 212 will be different.

Alternative techniques for route discovery include the technique disclosed by the present applicant company in International Patent specification WO02078271.

If the result of the search 41 discovers a node 210, 212 that is working and is connected to the same DP 21, (step 46y) the initiating node 211 can determine that the problem is in the connection 31 between the node 211 and the DP 21.

If no such working node can be found at this level (step 46x), it follows that all nodes 210, 211, 212 connected to the DP 21 are affected, so it is likely that the problem is in the DP 21 itself, or in its connection to the PCP 24. The process then continues (step 47), by attempting to identify a working node 200, 201, 202 connected at the next level, that is to say connected to the same PCP 24, but through a different DP 20. Thus the search 41 resumes, but now looking for operational nodes assigned to the same PCP 24. If a working node can be found at this higher level, (e.g. 201, 202) (step 46y), the initiating node 211 can identify that the problem is in the DP 21, or on the link 33 connecting the DP 21 to the PCP 24. However, if no working node can be found at this level (step 46x), it can be assumed that all nodes 200, 201, 202, 210, 211, 212 connected through the PCP 24 are affected.

The process 41, 46, 47 continues at each level until a working node can be found. The level at which success is first achieved allows the initiating node 211 to identify the likely location of the fault (step 48).

The node 211 which identified the fault can now access the Internet (step 49) via a connection 37 to the closest working node (e.g. 220) and its broadband connection (22, 25). Alternatively, the initiating node 211 may use an alternative network such as GSM/GPRS if it, or another reachable node in the mesh, is capable of doing so. This connection is used to inform the network operator of the fault and its location.

If no working node can be found at any level (step 471) this indicates that the network connections of all nodes in the entire mesh are down, possibly indicative of a fault in the exchange 2. However, if a GSM/GPRS connection or other means independent of the branched network is available to a member of the mesh this information can be passed on to the network provider using that connection (steps 48, 49). Such an indication would provide information on the levels that have been attempted for connection, as in many circumstances the ad hoc network may not provide universal connectivity. Thus, for example, if there were no connections 36, 37 (FIG. 3) between the nodes connected to the PCP 24 and those connected to the PCP 25, such that there were two independent ad-hoc networks, any failure message transmitted by a node 211 could only give information about connectivity in that part of the branched network that the node had been able to contact.

In a further development of the invention, the network nodes share information about the connectivity of nearby nodes, which allows them to produce a single fault report describing the fault situation for the ad-hoc network of which it forms a part, reducing the number of individual reports which need to be processed by the network operator.

Where the terminals form more than one separate ad-hoc network, the network operator may be able to confirm or refine the diagnosis of the location of a fault by comparison between reports from different terminals. For example, if the link 35 (FIG. 3) is not present, three nodes 221, 222, 223 connected to the same DP 22 may all find the nearest available working nodes 230, 232 to be connected to a different DP 23, suggesting a fault on the DP 22 common to the two nodes 221, 222. However, the absence of a connection 35 between the terminals 221, 222 detecting a fault on the one hand, and another terminal 220 connected to the same DP 22 on the other hand, prevents them co-operating to establish whether that terminal 220 is also experiencing a fault. If that node 220, which is connected to the same DP 22, is in fact working normally, this would indicate that the DP 22 is not faulty, and the faults detected by the other terminals 221, 222, 223 are of more local origin—probably on their connections to the DP 22. Similarly, as will be discussed, if the connection 39 between nodes 230 and 231 is absent, nodes 224 and 231 form a network completely separate from the other nodes.

The process by which a node can collect data relating to the connectivity of its neighbors will now be discussed. It will be assumed for simplicity that the process starts only when the primary connection is lost, although in practice the node may undertake background monitoring of the ad hoc network even when its primary connection is working.

When the node loses its primary connection for longer than some predetermined period the node enters 'fault mode' and seeks to make use of a wireless ad hoc network as already described with reference to FIG. 5. As a result of its searching, it also receives data from neighboring nodes in the ad hoc data about their own connectivity both to the node under discussion and to a primary connection, and also information on their position in the branched structure illustrated in FIG. 2. This can be represented by a table of the form shown in Table 1, in which the neighboring nodes populate the cells according to the number of hops in the ad hoc network needed before that node reaches a connected node (rows), and the relative position in the hierarchy between that node and the subject node (columns). So, taking the example of FIG. 2, and taking node 221 as the subject node, nodes 220, 222, 223, 224 sharing the lowest-level shared element in the hierarchy (DP 22) will appear in the 'Level 0' column, nodes 230, 231, 232 connected to it only at the next level 25 will appear at level 1, etc. The row in which they appear will depend on whether their connection is currently in operation (in which case they will appear in Row 0) or, otherwise, how many hops they are away from a node which is so connected.

TABLE 1

| Distance to connection | This node | Level 0 | Level 1 | etc | Level n |
|---|---|---|---|---|---|
| 0 | | | | | |
| 1 | | | | | |
| 2 | | | | | |
| 3 | | | | | |
| m | | | | | |

Thus any node which still has its primary connection will appear in this table in row '0'. A node which has lost its own connection, but has a direct wireless link to a connected node will be in row '1'. The individual entries will include the node's ID and the distance from the subject node in the ad hoc network.

This table allows the node to build up a picture of its neighboring nodes, in terms of: their distance from primary network connectivity, their distance from the present node in the ad hoc network, and their 'hierarchical' distance from the present node in the primary connectivity network.

Two examples of populating such a table will now be discussed, with further reference to FIG. 3. In this simplified network, the links 36, 37 in FIG. 3 are not operational, and we consider only the five nodes 220, 221, 222, 223, 224, connected to distribution point 22, and the three nodes 230, 231, 232, connected to distribution point 23.

Both these distribution points are connected to the same PCP 25. These nodes also form an ad-hoc network in which:
node 220 is within wireless range of node 221 only
node 221 is within wireless range of 220, 222 and 232
node 222 is also within wireless range of 221, 223 and 230
node 223 is within wireless range of node 222 only
node 224 is not within wireless range of any of 220, 221, 222 or 223, but is in wireless range of 231
node 230 is within wireless range of nodes 222, 231 and 232
node 231 is within wireless range of 224 and 230
node 232 is within wireless range of nodes 221 and 230.

For the first example we imagine that node 221 loses its connection 60 to the distribution point 22 due to a local fault (e.g. the drop line to the customer premises is broken). The other nodes 220, 222, 223, 224 using the same distribution point are unaffected. When node 221 recognizes that its connection 60 is lost it enters fault mode and attempts to make ad hoc wireless connections. It discovers three accessible nodes 220, 222, 232. In this example all three have intact primary connections to their respective distribution points 22, 23.

Node 221 now begins to populate its copy of Table 1, as shown in Table 2:

TABLE 2

| Distance to connection | This node | Level 0 | Level 1 | etc | Level n |
|---|---|---|---|---|---|
| 0 | | 220(1), 222(1) | 232(1) | | |
| 1 | 221(0) | | | | |
| 2 | | | | | |
| 3 | | | | | |
| M | | | | | |

In words this means: This is node 221, which is one hop from a node with an intact primary connection (as it is in row "1").

Nodes 220 and 222 appear in the column labelled "level 0" as their connections to the hierarchy are common with that of the subject node (221), at the lowest level—i.e. they are served by the same distribution point 22. Both these nodes appear in row 0 as they both have an intact primary connection. Their entries in Table 2 are suffixed by a "1" to indicate that they are each one hop away from node 221 in the ad hoc network. (Instead of a suffix, the table may be expanded to three dimensions, but this is not possible to represent clearly on the page.)

Node 232 is not served by the same distribution point as node 221, and their common connection point (PCP 25) is therefore one level further up the hierarchy. This is indicated by node 232 being entered the column of Table 2 labelled "level 1". Like nodes 220, 222, it is one hop away from node 221 in the ad hoc network (suffix 1) and it has an intact primary connection (row 0).

Node 221 continues to add information to its table where possible. In one variant embodiment, only nodes that have lost connection to the branched network collect such data, although the data they collect will include any neighboring nodes that remain connected. The still-connected nodes do not need to collect such data themselves, as they can communicate through the branched network, and so collecting data on the structure of the ad hoc network may be considered an unnecessary overhead.

However, in another variant, the nodes 220, 222, 232 still connected to the branched network also exchange information over the other available wireless links to nodes 223, 230 etc, allowing the tables to be populated with details of the more remote nodes 223, 224, 230, 231—see table 3. In this example all nodes except node 221 are directly connected to the branched network (row 0), either at the lowest (level 0) or next lowest level (level 1) common with node 221, and are remote from node 221 by the number of hops indicated by the suffix appended to each node's identifier.

TABLE 3

| Distance to connection | This node | Level 0 | Level 1 | etc | Level n |
|---|---|---|---|---|---|
| 0 | | 220(1), 222(1), 223(2), 224(4) | 232(1), 230(2), 231(3) | | |
| 1 | 221(0) | | | | |
| 2 | | | | | |
| 3 | | | | | |
| m | | | | | |

As already described with reference to FIG. 5, node 221 now submits its fault report to the network provider (step 49, FIG. 5) through a neighboring node in the ad hoc network, either 220 or 222.

For the second example we suppose that nodes 221, 220, 222, 223 and 224 all simultaneously lose their primary connections. A possible cause for such an event is damage to the distribution point 232, such as the pole supplying all these customer premises being brought down. Again 221 enters fault mode and begins filling its table. It discovers three nodes to which it is directly connected over the ad hoc network, and the data it collects is now represented in Table 4:

TABLE 4

| Distance to connection | This node | Level 0 | Level 1 | etc | Level n |
|---|---|---|---|---|---|
| 0 | | | 232(1) | | |
| 1 | 221(0) | 222(1) | | | |
| 2 | | 220(1) | | | |
| 3 | | | | | |
| m | | | | | |

Note that nodes 220 and 222 are in different rows to those in which they appear in Table 2, because they are now not directly connected to the branched network. In this case, a fault report can be submitted via node 232.

However, there is still more information to be gathered. Node 223 is also in fault mode, so by exchanging data with node 222 (to which both nodes 221 and 223 are connected) the table for node 221 can be updated to include information collected by node 223—(Table 5):

TABLE 5

| Distance to connection | This node | Level 0 | Level 1 | etc | Level n |
|---|---|---|---|---|---|
| 0 | | | 232(1) | | |
| 1 | 221(0) | 222(1) | | | |
| 2 | | 220(1), 223(2) | | | |
| 3 | | | | | |
| m | | | | | |

In words: This node is node 221 and is one hop from a connected node (232) whose common connection with this node (PCP 25) is one level away in the hierarchy. This node (221) is also one hop from a node (222) which is connected at the same level in the hierarchy (DP22) and is itself one hop from a connected node (230). The subject node (221) is also aware of two more nodes (220, 223) which are themselves both two hops from a connected node (232, 230 respectively). Of these, node 220 is one hop from the subject node (221) and node 223 is two hops from the subject node (221).

It will be noted that in the situation described above all five nodes 221, 220, 222, 223, 224 connected to the distribution point 22 will be capable of generating fault reports. In the scenario of Table 5, where only the nodes detecting faults exchange data with each other, nodes 221, 220, 222 and 223 will each determine that the other three have detected the same fault, but because node 224 is only connected through node 231, which is not reporting a fault, the data will be incomplete. Node 224 will, of course, report separately if it also detects a fault, and the exchange can collate the results accordingly.

However, if exchanges of fault data also take place between nodes such as 232, 230, 231 which are not themselves currently experiencing a fault, it would be possible for node 221 to obtain a complete picture, as shown in Table 6:

TABLE 6

| Distance to connection | This node | Level 0 | Level 1 | etc | Level n |
|---|---|---|---|---|---|
| 0 | | | 232(1), 230(2), 231(3) | | |
| 1 | 221(0) | 222(1), 224(4) | | | |
| 2 | | 220(1), 223(2) | | | |
| 3 | | | | | |
| m | | | | | |

This therefore gives a comprehensive report of the status of all nodes in the ad hoc network, and in particular that nodes 221, 220, 222, 223 and 224 are all disconnected from the branched network (none of them are in row "0").

By submitting the information it has gathered about its local network connectivity, a node should assist centralized diagnosis of the underlying problem. However, rather than relying on a central controller to gather in reports from all nodes and then consolidate them, it is possible to reduce the generation of redundant multiple fault reports by generating a single report on behalf of all failed nodes, encompassing all relevant information about those nodes.

To achieve this, following a period of table-filling as described above, the nodes select a 'reporter' node which will compile and transmit a consolidated fault report. The selection could take place in various ways. The selection could be essentially random, or made only from among the still-connected-nodes which provide a back-up route for the faulty nodes. However, it is preferred to select from among the nodes currently disconnected, but with a bias towards nodes which are most closely connected to a still-connected-node. In the tabular structure above, this would select a node from the first populated row other than row "0".

In Table 6 above, nodes 221, 222 and 224 are all examples of this. These are nodes which are detecting, faults and are each directly connected over the ad hoc network to a node (232, 230, 231 respectively) which is still connected to the branched network. The use of such nodes is preferred because it is desirable that any overhead of compiling a fault report falls on a faulty node, to reduce the disincentive on still-connected-nodes to take part in the data exchange, and because it is desirable that the report does not have to traverse a lengthy ad hoc path (many hops) before it can be submitted directly via a primary link.

So, having filled its table, each node checks to determine if its own 'this node' entry is in the row reading 'distance to connection 1', i.e. is there an immediate neighbor in the ad hoc network which still has a functioning primary connection? Any node for which this is the case initiates a negotiation with the other nodes for which an entry appears in the same row of the table, the outcome of which will be that one node is selected as reporter and the other nodes do not send reports.

This selection process can be achieved by various means, for example by a predetermined order of precedence. Another means for achieving this result (one node reports, others are silent) would be to use a form of mutual inhibition, i.e. each node transmits an inhibition signal, whose intensity is reduced in proportion to the amount of inhibition signal it receives from other nodes. An example of such a process is described in the applicant's International patent specification WO99/56488. Provided there is some noise or initial inequality in the system (which could perhaps be introduced by the fact that nodes will not be perfectly synchronized and hence some will initiate the inhibitory process a little ahead of others), such an arrangement will eventually arrive at a situation where one node has become a very 'loud' inhibitor of all the others.

It should be noted that the proposed system is strongest when there is constant 'gossiping' via wireless ad hoc connections even when most (or all) nodes still have their primary connection intact. This is particularly useful in cases, such as in the example of Table 6, where a group of nodes 221, 220, 222, 223, 224 sharing a 'level 0' relationship (i.e. using the same distribution point 22) is not fully connected in a self-contained ad hoc network. In this example, nodes 221, 220, 222 and 223 are all connected together over a wireless network, but they will have no information about node 224 (including whether it still has its primary connection or not) unless nodes 230 and 231 are also exchanging data. Such knowledge will make a significant difference to the fault report that might be sent. If node 224 does still have its primary connection, it proves that the fault is not at the distribution point 22. The tables above reveal which collections of nodes have a working primary connection and which ones have not. If we assume that all available information within the boundaries of the wireless ad-hoc network has been spread via gossiping, we then know that the table contains all nodes of the ad-hoc network and their status of connectivity. From the table it can be directly derived at which level (node (e.g. 221), DP (e.g. 22), PCP (e.g. 23), exchange etc.) the fault occurred.

in the examples above, it is assumed that all nodes can form a single connected ad-hoc network, i.e. there is a path between any two nodes. In reality, this might not be the case. It is possible for the nodes to form a number of separate wireless ad-hoc networks. Consequently, a node might not capture enough information to make a final decision as to at which level a fault has occurred.

For example, consider a variation of the initial configuration shown in FIG. 3, in which the connection 39 in the ad hoc network, between nodes 230 and 231, is absent. Thus nodes 224 and 231 form an ad hoc network detached from the rest of the ad-hoc network. In the situation of Example 2, the ad-hoc network 220-223, 230, 232 could deliver the data in table 7:

TABLE 7

| Distance to connection | This node | Level 0 | Level 1 | etc | Level n |
|---|---|---|---|---|---|
| 0 | | | 232(1), 230(2) | | |
| 1 | 221(0) | 222(1) | | | |
| 2 | | 221(1), 223(2) | | | |
| 3 | | | | | |
| m | | | | | |

The ad-hoc network 224, 231 could produce table 8:

TABLE 8

| Distance to connection | This node | Level 0 | Level 1 | etc | Level n |
|---|---|---|---|---|---|
| 0 | | | 231(1) | | |
| 1 | 224(0) | | | | |
| 2 | | | | | |
| 3 | | | | | |
| m | | | | | |

Thus, fault reports would be sent from each node, but none of them would be complete and they would have to be consolidated to generate the complete picture. The consolidation of these two tables is straightforward if we maintain the identity of each level (distribution point, PCP, exchange etc) to which the table is referring. These identities can then be mapped to the structure of the branched network, so that tables 7 and 8 can be merged to form table 9:

TABLE 9

| Distance to connection | This node | Level 0 | Level 1 | etc | Level n |
|---|---|---|---|---|---|
| 0 | | | 230, 231, 232 | | |
| 1 | 221, 224 | 222 | | | |
| 2 | | 220, 223 | | | |
| 3 | | | | | |
| m | | | | | |

The merge has been performed at Level 0, i.e. both tables carry the same Level 0 identity. The central system then recognizes that fault reports have been sent by nodes 221 and 224, that the nodes 220-224 have all lost their primary connections, but that other nodes 230-232 using the same Level 1 junction (the cross-connect 25) are working. Therefore, a fault can be assumed at Level 0 (i.e. the distribution point 22).

The fault reports are transmitted through a working connection to a monitoring system. Whenever a fault report is received, the monitoring system checks for the highest-numbered level "i" that does not have a primary connection, which is Level 0 in the examples above. It then checks for other incoming fault reports with the same Level i ID and aggregates these tables. If nodes with a primary connection at Level i exist in the aggregate table, then the central system recognizes that the fault must have occurred at Level i−1, which is the nodes itself in case of i=0. Otherwise, the fault is at Level i.

Such aggregation of reports does not have to be executed in a single central system: devices at intermediate levels could perform aggregation in order to reduce the data overhead on the central system. For instance, if Level i is failing but Level i+1 is not then the device at Level i+1 can aggregate the report tables and send it to the central system. Alternatively, the Level i+1 device could already determine the fault location as described above and simply forward the fault location to the central system.

The situation is more complex if some of the nodes are not able to find a primary connection in their neighborhood and do not have other means like a GSM/GPRS connection of sending a fault report. Also, a node might simply be turned off and can, therefore, not provide information or act as information relay. Consequently, the fault reports will not be complete in the sense that the central system cannot know the connection status of the missing nodes. If we assume the aggregate table from above, there are two different scenarios.

First, there is no node in the aggregate table with primary connection at Level i. In this case, one of the missing nodes might actually have connection. Second, all nodes at Level i+1 in the aggregate table have primary connection, but one of the missing ones might not. This second case is straightforward because the existence of working nodes at Level i+1 confirms that the fault is not at Level i+1, but at lower-numbered levels. A reasonable way of treating the first case is to simply assume that Level i is failing because of missing counterexamples. Alternatively, one might consider the number of nodes wired to each Level i junction, and responding according to a predetermined proportion of them reporting faults, in the absence of counterexamples. For example, if five nodes are wired to a distribution point, and the fault report indicates that three of those nodes are not working, and there is no report from the other two, this indicates that at least three of the five nodes have failed. Thresholds for this probability can be employed to determine whether to treat this as a single fault at the distribution point or separate faults at the individual nodes.

What is claimed is:

1. A method of operating a telecommunications network wherein a plurality of nodes are connected to a network control center through a branched hierarchical network having a plurality of levels, and also have the capability to form a second, ad hoc, network by making direct connections with other nodes, said method comprising:
on receipt of an attempt to establish communication over the ad hoc network, causing each node to respond by identifying its position in the branched hierarchical network,
if a first node detects a failure of its network connection through the branched hierarchical network, it attempts communication over the ad hoc network to reach a second node whose connection to the network control center through the branched hierarchical network has not failed,
wherein the first node initially attempts to establish communication over the ad hoc network with a node connected to the same point in the next level of the branched hierarchical network towards the network control center, and then at levels in the hierarchical network progressively closer to the network control center, until a second node is identified which has not experienced a network failure, and
wherein the first node generates a report for transmission to the network control center indicative of the level in the branched hierarchical network at which the first and second nodes have a common point of connection, and transmitting the report from the first node to the network control center by way of the ad hoc network.

2. A method according to claim 1 in which the report is transmitted by way of the ad hoc network and the second node.

3. A method according to claim 2 wherein, if the first node identifies a plurality of available nodes at one level in the branched hierarchical network, the first node selects, as the second node, the node with the shortest hop distance in the ad hoc network.

4. A method according to claim 1, wherein the nodes collect and store connectivity data on neighboring nodes, and at least the nodes not currently connected to the branched hierarchical network exchange the said connectivity data between themselves to identify nodes, and groups of nodes, that are not currently connected to the branched hierarchical network.

5. A method according to claim 4, in which all nodes exchange such data over the ad hoc network.

6. A method according to claim 4 wherein, within a group of nodes which have exchanged connectivity information, one of the group is selected to transmit a report on connectivity to the network control center, the remaining members of the group being suppressed from transmitting such reports.

7. A method according to claim 4, wherein connectivity information collected from separate ad hoc networks is aggregated at the network control center or intermediate points in the branched hierarchical network, to identify failure points in the hierarchical network.

8. A telecommunications network comprising:
a plurality of nodes connected to a network control center through a branched hierarchical network having a plurality of levels, wherein the nodes also have the capability to form ad hoc connections between each other,
each node having:
connectivity identification means for responding to an attempt to establish communication over the ad hoc network by identifying its position in the branched hierarchical network,
failure detection means for detecting a failure of its network connection through the branched hierarchical network, and
paging means for attempting to establish communication with the network control center by forming an ad hoc connection through other nodes to a second node whose connection to the network control center through the branched hierarchical network has not failed,
wherein the paging means is arranged to initially attempt connection with a second node connected to the same point at the next level of the branched hierarchical network towards the network control center, and then at levels in the hierarchical network progressively closer to the network control center, until a node is identified which has not experienced a network failure, and
reporting means for generating a report for transmission to the network control center indicative of the level in the branched hierarchical network at which the first and second nodes have a common point of connection.

9. A network according to claim 8, comprising transmission means for transmitting the report to the network control center by way of the ad hoc network and the second node.

10. A network according to claim 9, wherein each node has selection means for selecting for communication with the network control center, from a plurality of available nodes at the same level in the branched hierarchical network, the node with the shortest hop distance in the ad hoc network.

11. A network according to claim 8, wherein the nodes have data processing means for collecting and storing connectivity data on neighboring nodes, and communication means for data exchanging the said connectivity data with other nodes and processing such data, at least in nodes not currently connected to the branched hierarchical network, to identify other nodes, and groups of nodes, that are not currently connected to the branched hierarchical network.

12. A network according to claim 11, in which all nodes, including those currently connected to the branched hierarchical network, process the connectivity data to identify nodes that are not currently connected to the branched hierarchical network, and groups of such nodes.

13. A network according to claim 11 wherein the nodes have selection means to determine which of a group of such nodes which have exchanged connectivity information, is to transmit a report on connectivity to the network control center, the nodes having means to suppress the remaining members of such a group from making such a transmission.

14. A network according to claim 11, wherein the network control center, or intermediate points in the branched hierarchical network, have data aggregation means for collecting connectivity information from separate ad hoc networks and aggregating the data to identify failure points in the hierarchical network.

15. A communications device comprising:
- first connection means for connection to a network control center system through a first communications network comprising a branched hierarchical network,
- second connection means for forming connections with similar communications devices over a second, ad hoc, communications network,
- reception means to receive a request from a similar device to establish communication with the network control center,
- transmission means for responding with data relating to its own position in the first communications network,
- failure detection means for detecting a failure of the network connections through the first communications network, and
- paging means for attempting to establish communication with other communications devices over the second communications network,
- wherein the paging means is arranged to initially attempt connection with a second node connected to the same point at a next level of the branched hierarchical network, and then at levels in the hierarchical network progressively closer to the network control center, until a node is identified which has not experienced a network failure, and
- reporting means for generating a report for transmission to the network control center indicative of the level in the branched hierarchical network at which the first and second nodes have a common point of connection.

16. A communications device according to claim 15, wherein the reporting means is arranged to transmit the report to the network control center by way of the ad hoc network and the second node.

17. A communications device according to claim 16, having selection means for selecting for communication with the network control center, from a plurality of available nodes at the same level in the branched hierarchical network, the node with the shortest hop distance in the ad hoc network.

18. A communications device according to claim 15, further comprising:
- communication means to exchange the said connectivity data with other nodes, and
- data processing means for collecting and storing connectivity data on neighboring nodes, at least when not currently connected to the branched hierarchical network, to identify nodes, and groups of nodes, that are not currently connected to the branched hierarchical network.

19. A communications device according to claim 18, in which the data processing means is operable to identify neighboring nodes that are not currently connected to the branched hierarchical network, when the communications device is itself connected to the branched hierarchical network as well as when it is not so connected.

20. A communications device according to claim 18, further comprising:
- selection means for co-operating with a group of nodes to select one of the group to transmit a report on connectivity to the network control center, and
- suppression means for suppressing the transmission of such reports if the device is not selected by the selection means.

* * * * *